United States Patent
Sang et al.

(10) Patent No.: US 11,590,742 B2
(45) Date of Patent: Feb. 28, 2023

(54) UV PROTECTIVE SURFACING MATERIALS FOR COMPOSITE PARTS

(71) Applicant: CYTEC INDUSTRIES INC., Princeton, NJ (US)

(72) Inventors: Junjie Jeffrey Sang, Newark, DE (US); Dalip K. Kohli, Churchville, MD (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 0 days.

(21) Appl. No.: 16/485,303

(22) PCT Filed: Dec. 20, 2018

(86) PCT No.: PCT/US2018/066883
§ 371 (c)(1),
(2) Date: Aug. 12, 2019

(87) PCT Pub. No.: WO2019/126550
PCT Pub. Date: Jun. 27, 2019

(65) Prior Publication Data
US 2021/0008855 A1    Jan. 14, 2021

Related U.S. Application Data

(60) Provisional application No. 62/608,949, filed on Dec. 21, 2017.

(51) Int. Cl.
*B32B 27/12* (2006.01)
*B32B 5/02* (2006.01)
(Continued)

(52) U.S. Cl.
CPC .............. *B32B 27/12* (2013.01); *B32B 5/024* (2013.01); *B32B 5/26* (2013.01); *B32B 7/06* (2013.01);
(Continued)

(58) Field of Classification Search
CPC ........... B32B 27/12; B32B 5/024; B32B 5/26; B32B 7/06; B32B 15/02; B32B 15/092;
(Continued)

(56) References Cited

U.S. PATENT DOCUMENTS

| 9,364,857 B1* | 6/2016 | Uhl ......................... C09D 5/002 |
| 2006/0182949 A1* | 8/2006 | Salnikov .................. C08J 7/043 |
| | | 428/327 |
| 2014/0154496 A1 | 6/2014 | Sang |

FOREIGN PATENT DOCUMENTS

| WO | 2017095810 A1 | 6/2017 |
| WO | 2017112766 A1 | 6/2017 |

OTHER PUBLICATIONS

M. Kanerva, et al: "The peel ply surface treatment for adhesive bonding of composites: A review", International Journal of Adhesion and Adhesives, Elsevier, Amsterdam, NL, vol. 43, Feb. 1, 2013, pp. 60-69.

* cited by examiner

*Primary Examiner* — Callie E Shosho
*Assistant Examiner* — Bethany M Miller
(74) *Attorney, Agent, or Firm* — Thi Dang

(57) ABSTRACT

A surfacing material that is capable of ultraviolet (UV) protection. The surfacing material is a multilayer structure composed of a woven peel ply fabric interposed between a first curable resin layer and a second curable resin layer. The surfacing material is designed to be co-cured with a composite substrate, for example, a prepreg layup. Upon curing, the peel ply fabric combined with the outer thermoset layer function as a UV protective layer. When the peel ply fabric and the outer thermoset layer are removed, a paint-ready surface is revealed. Such surface does not require any surface preparation prior to painting.

12 Claims, 3 Drawing Sheets

(51) Int. Cl.
  *B32B 7/06* (2019.01)
  *B32B 15/02* (2006.01)
  *B32B 15/092* (2006.01)
  *B32B 27/38* (2006.01)
  *B32B 27/18* (2006.01)
  *B32B 38/18* (2006.01)
  *B32B 5/26* (2006.01)

(52) U.S. Cl.
  CPC ............ *B32B 15/02* (2013.01); *B32B 15/092* (2013.01); *B32B 27/18* (2013.01); *B32B 27/38* (2013.01); *B32B 38/1808* (2013.01); *B32B 2262/0261* (2013.01); *B32B 2262/0276* (2013.01); *B32B 2264/102* (2013.01); *B32B 2307/202* (2013.01); *B32B 2307/71* (2013.01); *B32B 2307/748* (2013.01)

(58) Field of Classification Search
  CPC ..... B32B 27/18; B32B 27/38; B32B 38/1808; B32B 2262/0261; B32B 2262/0276; B32B 2264/102; B32B 2307/202; B32B 2307/71; B32B 2307/748; B32B 2250/03; B32B 2250/04; B32B 2250/40; B32B 2307/732; B32B 2571/00; B32B 15/20; B32B 5/24; B32B 15/08
  See application file for complete search history.

UV PROTECTIVE SURFACING MATERIALS FOR COMPOSITE PARTS

CROSS-REFERENCE TO RELATED APPLICATIONS

The present application is a U.S. national phase entry under 35 U.S.C. § 371 of International Application No. PCT/US2018/066883, filed on 20 Dec. 2018, which claims priority to U.S. provisional application No. 62/608,949, filed on 21 Dec. 2017, the entire content of each of these applications is explicitly incorporated herein by reference.

DETAILED DESCRIPTION

Fiber-reinforced, polymer matrix composite (PMC) is a high-performance structural material that is commonly used in applications requiring resistance to aggressive environments, high strength, and/or low weight. Examples of such applications include aircraft components (e.g., tails, wings, fuselages, and propellers), high performance automobiles, boat hulls, and bicycle frames. Composite structural parts for aerospace applications typically include a surfacing film to provide the required performance characteristics to the composite structures prior to painting. These surfacing films are used to improve the surface quality of the structural parts while reducing labor, time and cost. The surfacing films are usually co-cured with the fiber-reinforced polymer matrix composite materials during the manufacturing of the structural parts.

Conventional epoxy-based surfacing films have been found to lack ultraviolet (UV) resistance such that, after exposure to UV radiation, they showed color change and/or surface degradation, i.e. chalking and loss of paint adhesion. To overcome this shortcoming, a paint primer with UV protection components is typically applied to cover all exposed composite surfaces soon after de-molding the cured part from the mold. The drawbacks to using such paint primer include high labor cost, high maintenance cost, added weight and adverse environmental impacts due to organic solvents typically used in the paint primers. The use of gel coats or other protective coatings such as paint has been the more effective way of protecting the surfacing film from UV exposure and abrasion. However, both gel coats and paints require regular maintenance and are not considered permanent fixes.

Figure 1:
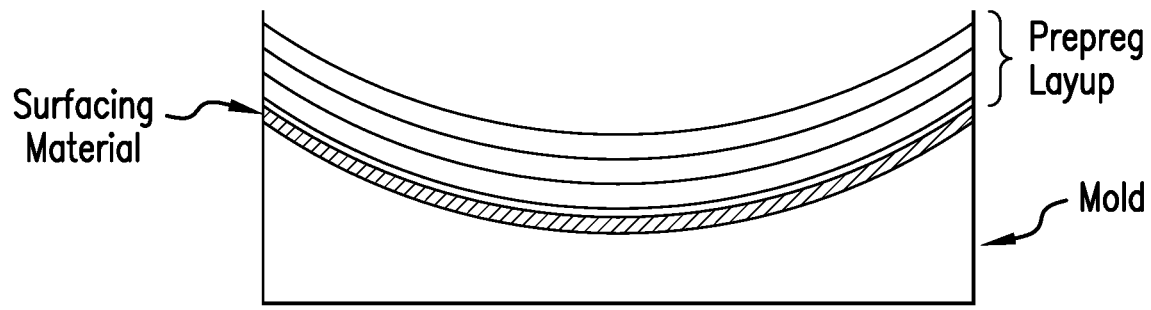
FIG. 1 schematically shows a prepreg layup with a surfacing material being formed on a molding tool.

Another aspect of aerospace composite manufacturing is that the exposed surfaces of composite parts require a highly smooth surface prior to painting. To that end, surfacing films are routinely integrated into the fabrication of component parts to achieve such smooth surface. In the case of concave mold surface, a curable surfacing film may be placed onto a mold surface prior to laying down the composite prepreg plies. FIG. 1 schematically shows a mold with a concave surface, a curable surfacing material (in the form of a film) over the concave surface of the mold, and a prepreg layup laid over the surfacing material. The surfacing film and the prepreg layup are co-cured to form a composite part. After curing, it is common to remove mold release by sanding followed by the application of a curable filler to fill in cracks and holes. The filler is then cured and sanded repeatedly to provide a smooth surface. This is followed by the application of a paint primer, sanding, reapplying paint primer, and then applying a finishing top coat of paint. This conventional process involves a high amount of labor and requires refinishing on a periodic basis. These recurring steps add significant cost to the manufacturing of composite parts.

One aspect of the present disclosure is directed to a surfacing material with a peel ply incorporated therein to provide UV protection prior to painting. When the peel ply is removed, the surface being revealed is ready for painting without the conventional intervening surface treatments, i.e., the revealed surface is "paint-ready".

Figure 2:
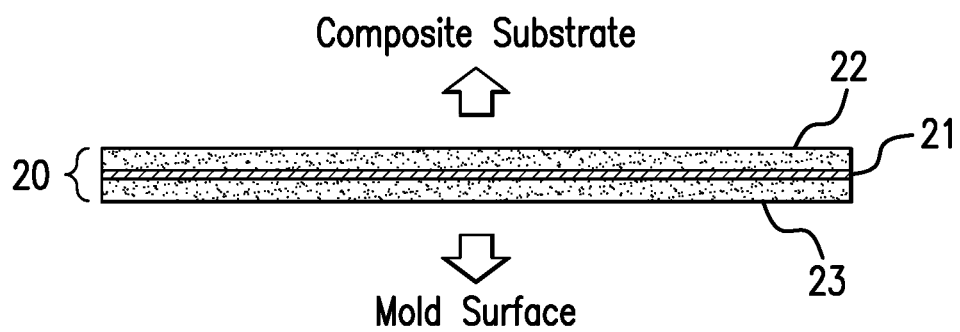
FIG. 2 schematically illustrates a surfacing material with an integrated peel ply fabric according to one embodiment.

According to one embodiment shown in FIG. 2, the UV protective surfacing material 20 is a multilayer structure that includes a woven peel ply fabric 21 interposed between two curable resin layers 22 and 23. The layers are laminated together to form an integrated structure. One of the curable resin layers will be in contact with a curable composite substrate, e.g., a prepreg layup, while the other resin layer will be in contact with the mold surface of a tool during composite part manufacturing. The surfacing material 20 is designed to be co-cured with the curable composite substrate. After co-curing, the resin layers 22 and 23 become hardened thermoset layers.

Figure 3:
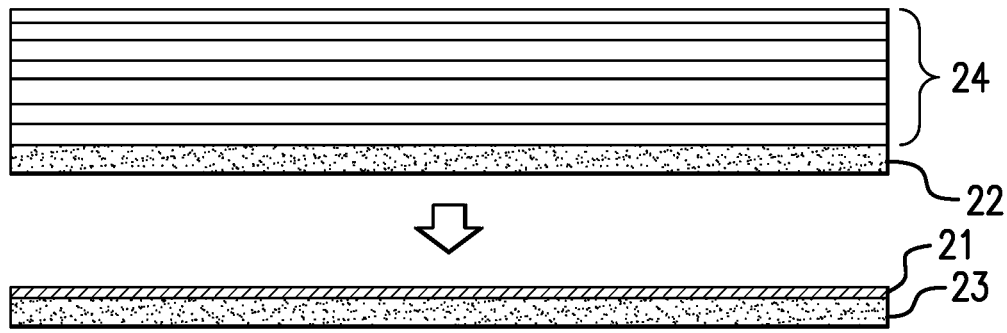
FIG. 3 illustrates the application of the surfacing material shown in FIG. 2 on a composite substrate.

After the composite substrate and the surfacing material have been co-cured, the resulting composite part is removed from the tool and can be left in this form at ambient temperature until the composite part is ready for painting. As illustrated in FIG. 3, the peel ply fabric 21 can be peeled off together with the outer cured thermoset layer 23 (derived from the outer resin layer) to reveal a surface that is ready for painting without requiring any intervening re-finishing or surface treatment such as sanding and filling. The fabric construction is selected such that no broken fibers are left on the remaining thermoset layer 22 after the peel ply fabric 21 has been removed. The fracture line during peeling is at the fabric-polymer interface between the remaining thermoset layer 22 and the peel ply fabric 21. After peel ply removal, the remaining thermoset layer 22 becomes the outermost layer on the cured composite substrate 24 and provides the paint-ready surface. To ease the peeling process, the length and/or width of the peel ply fabric may be configured to extend beyond an edge of the resin layer 22.

As an option, a non-removable textile carrier may be laminated to the side of the curable resin layer 22 that is not in contact with the peel ply fabric 21 or is embedded in the resin layer 22. Such textile carrier remains as an integrated structure in the final composite part. The textile carrier may be in the form of a nonwoven veil or woven fabric composed of glass fibers or polymeric fibers such as polyester. In this context, "embedded" means fixed in a surrounding mass.

Figure 4:
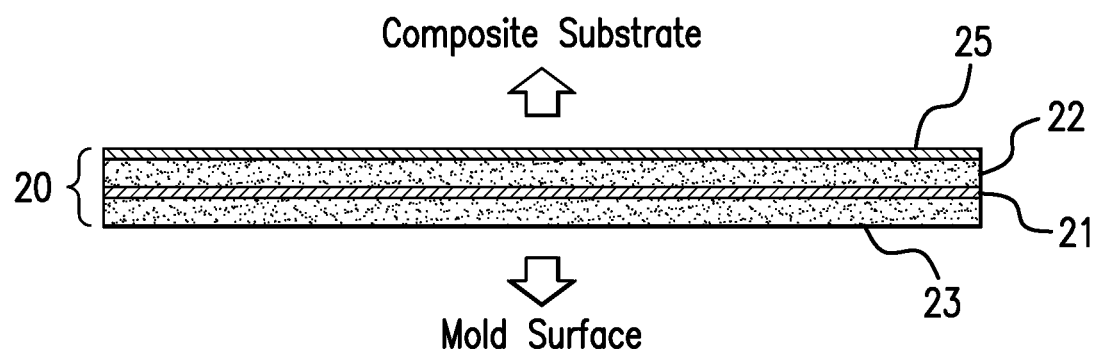
FIG. 4 schematically illustrates a surfacing material capable of lightning strike protection (LSP) according to another embodiment.

In another embodiment shown in FIG. 4, the multilayer surfacing material further includes an electrically conductive layer 25 adjacent to the curable resin layer 22 such that the curable resin layer 22 is between the peel ply fabric 21 and conductive layer 25. The conductive layer 25 will be in contact with the composite substrate. Such conductive layer will provide lightning strike protection (LSP) to the final composite part.

As an option, a non-removable textile carrier may be laminated to one side of the curable resin layer 22 such that the textile carrier is interposed between the resin layer 22 and the conductive layer 25. Alternatively, the textile carrier is embedded in the resin layer 22. As discussed previously, such textile may be in the form of a nonwoven veil or woven fabric composed of glass fibers or polymeric fibers such as polyester.

Peel Ply Fabric

The woven peel ply fabric is a light-weight, woven material composed of continuous polymeric fibers in a weaving pattern. The weaving pattern is not limited and may be plain weave, twill weave, basket weave, satin weave and the like. The woven fibers may be selected from polyester and polyamide fibers. Preferably, the woven fabric is a tightly woven fabric with a yarn count as follows: the number of warp yarns per square inch is greater than 70 (or greater than 10 yarns per $cm^2$), for example, 120-200 yarns per square inch (or 18-31 yarns per $cm^2$); and the number of weft (filling) yarns per square inch is at least 50 (or 7 yarns per $cm^2$), for example, 50-140 yarns per square inch (7-22 yarns per $cm^2$). In one embodiment, the woven fabric has a warp yarn count of 120-160 per square inch (or 18-25 yarns per $cm^2$) and a weft yarn count of 59-103 per square inch (9-16 yarns per $cm^2$). The woven fabric may have a thickness within the range of 3 mils to 5 mils (or 76 μm to 127 μm). The woven fabric may have an areal weight of 50 gsm to 130 gsm, in some embodiments, 60 gsm to 85 gsm, in other embodiments, 62 gsm to 82 gsm.

Conductive Layer

The conductive layer may a continuous nonporous layer such as a solid metal foil or a porous layer such as an expanded metal screen. The conductive layer preferably has a resistivity of less than 10 mΩ, more preferably, less than 5 mΩ. Moreover, the conductive layer preferably has a thickness of ≤3 mils (76.2 μm). In one embodiment, the conductive layer is a thin, nonporous metal foil having a thickness within the range of 3 μm to 75 μm. In another embodiment, the conductive layer is an expanded metal screen with an areal weight within the range of 60 gsm to 350 gsm.

The nonporous and porous conductive layer may be formed of metals selected from: copper, aluminum, bronze, titanium, alloys and combinations thereof. Alternatively, the conductive layer may be formed of a non-metallic material with intrinsic electrical conductivity such as carbon. Carbon in this context includes graphite. The nonporous conductive layer may be a carbon sheet, including graphene sheet and carbon-nanotube (CNT) paper. A specific example of CNT paper is flexible CNT Bucky paper.

Curable Resin Layers

Each of the curable resin layers in the multilayer surfacing material (layers 22 and 23 in FIGS. 2 and 4) is formed from a thermoset resin composition containing one or more thermoset resins, and optionally, a curing agent and/or catalyst. The compositions of the resin layers may be the same or different from each other.

Each curable resin layer may have a film weight of less than 0.1 psf (or 500 gsm), for example, 0.01-0.03 psf (or 50-150 gsm).

The terms "cure" and "curing" as used herein refer to the irreversible hardening of a pre-polymer material or a resin or monomers brought about by heating at elevated temperatures, exposure to ultraviolet light and radiation, or chemical additives. The term "curable" means can be to be cured into a hardened material.

Examples of suitable thermoset resins include, but are not limited to, epoxies, phenolic resins, cyanate esters, bismaleimides, benzoxazines (including polybenzoxazines), unsaturated polyesters, vinyl ester resins, and combinations thereof.

In some embodiments, the thermoset resin composition contains one or more multifunctional epoxy resins or polyepoxides and a curing agent. Multifunctional epoxy resin (or polyepoxide) contains two or more epoxy functional groups per molecule.

Examples of suitable polyepoxides include the polyglycidyl ethers, which are prepared by reaction of epichlorohydrin or epibromohydrin with a polyphenol in the presence of alkali. Suitable polyphenols are, for example, resorcinol, pyrocatechol, hydroquinone, bisphenol A (bis(4-hydroxyphenyl)-2,2-propane), bisphenol F (bis(4-hydroxyphenyl)methane), bis(4-hydroxyphenyl)-1,1-isobutane, 4,4'-dihydroxy-benzophenone, bis(4-hydroxyphenyl)-1,1-ethane, and 1,5-hydroxynaphthalene.

Also included are the polyglycidyl ethers of polyalcohols. Such polyalcohols include ethylene glycol, diethylene glycol, triethylene glycol, 1,2-propylene glycol, 1,4-butylene glycol, triethylene glycol, 1,5-pentanediol, 1,6-hexanediol, and trimethylolpropane.

Additional epoxy resins include polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Other epoxides may include those derived from the epoxidation products of olefinically-unsaturated cycloaliphatic compounds or from natural oils and fats.

Also included are liquid epoxy resins which are reaction products of bisphenol A or bisphenol F and epichlorohydrin. These epoxy resins are liquid at room temperature and generally have epoxy equivalent weight (g/eq) of from about 150 to about 480 as determined by ASTM D-1652.

Particularly suitable are epoxy novolac resins which are polyglycidyl derivatives of phenol-formaldehyde novolacs or cresol-formaldehyde novolacs having the following chemical Structure I:

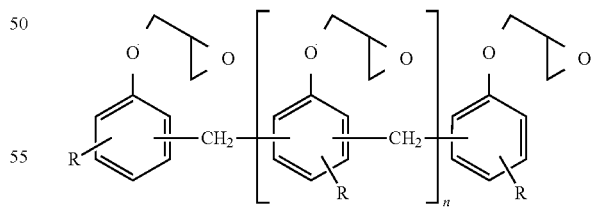

Structure I where n=0 to 5, and R=H or $CH_3$. When R=H, the resin is a phenol novolac resin. When R=$CH_3$, the resin is a cresol novolac resin. The former is commercially available as D.E.N. 428, D.E.N. 431, D.E.N. 438, D.E.N. 439, and D.E.N. 485 from Dow Chemical Co. The latter is commercially available as ECN 1235, ECN 1273, and ECN 1299 from Ciba-Geigy Corp. Other suitable novolacs that may be used include SU-8 from Celanese Polymer Specialty Co. In one embodiment, the epoxy novolac resin has a viscosity of 4000-10,000 mPa·s at 25° C. and epoxide equivalent weight (EEW) of about 190 g/eq to about 235 g/eq as determined by ASTM D-1652.

A particularly suitable multifunctional epoxy resin is a tetra-functional aromatic epoxy resin having four epoxy functional groups per molecule and at least one glycidyl amine group. An example is tetraglycidyl ether of methylene dianiline having the following general chemical Structure II:

Structure II

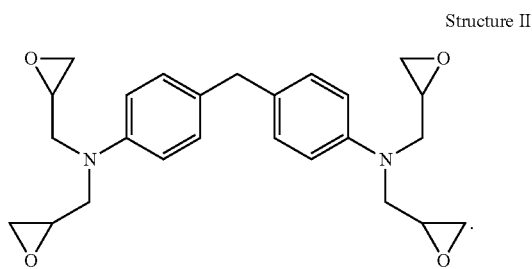 [SMILES: c1cc(N(CC2CO2)CC2CO2)ccc1Cc1ccc(N(CC2CO2)CC2CO2)cc1]

The amine groups in the structure are shown in the para- or 4,4' positions of the aromatic ring structures, however, it should be understood that other isomers, such as 2,1', 2,3', 2,4', 3,3', 3,4', are possible alternatives. Examples of commercially available tetra-functional epoxy resins are Araldite® MY 9663, MY 9634, MY 9655, MY-721, MY-720, MY-725 supplied by Huntsman Advanced Materials.

Another particularly suitable multifunctional epoxy resin is tri-functional epoxy resin having three epoxy functional groups per molecule, for example, triglycidyl ether of aminophenol. Specific examples of commercially available tri-functional epoxy resins are Araldite® MY 0510, MY 0500, MY 0600, MY 0610 supplied by Huntsman Advanced Materials.

Also suitable are cycloaliphatic epoxies, which include compounds that contain at least one cycloaliphatic group and at least two oxirane rings per molecule. Specific examples include diepoxide of cycloaliphatic alcohol, hydrogenated Bisphenol as represented by the following Structure III:

Structure III

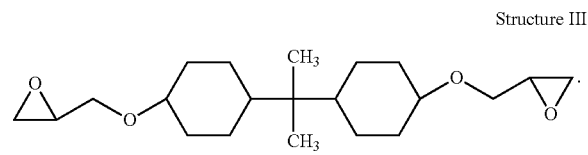

An example of such cycloaliphatic epoxy resin is EPAL-LOY® 5000 (a cycloaliphatic epoxy prepared by hydrogenating bisphenol A diglycidyl ether) available from CVC Thermoset Specialties. Other cycloaliphatic epoxides suitable for use in the pre-react adduct may include EPONEX cycloaliphatic epoxy resins, e.g. EPONEX Resin 1510 supplied by Momentive Specialty Chemicals.

The thermoset resin composition may be formulated so as to yield high $T_g$ and high cross-linked density. In some embodiments, a combination of epoxy novolac resin(s) and non-novolac multifunctional epoxy resin(s), particularly, tri-functional and/or tetra-functional epoxy, is used. The relative amounts of epoxy novolac resin and non-novolac multifunctional epoxy resin may be varied but it is preferred that the amount of epoxy novolac resin is with the range of about 80 to about 100 parts per 100 parts of non-novolac multifunctional epoxy resin. The combination of epoxy novolac resin and multifunctional epoxy resin at the specified proportion contribute to the desired high $T_g$ and cross-linked density upon curing.

The total amount of all resins makes up at least 15% by weight based on the total weight of the resin composition. As an example, the total amount of resins may constitute about 30% to about 60% by weight based on the total weight of the resin composition, or about 15% to about 25% by weight.

The thermoset resin composition may further include one or more polymeric toughening agents. The polymeric toughening agents may be selected from: thermoplastic polymers, elastomers, core-shell rubber particles, a pre-react adduct which is a reaction product of an epoxy resin, a bisphenol, and an elastomeric polymer, and combinations thereof. In some embodiments, a combination of two different toughening agents from this group is used. The amount of toughening agent(s), in total, may be about 1% to about 30%, in some cases, about 10% to about 20% by weight based on the total weight of the composition.

With regard to the pre-react adduct, suitable epoxy resins include diglycidylether of Bisphenol A, diglycidylether of tetrabromo Bisphenol A, hydrogenated diglycidyl ether of bisphenol A, or hydrogenated diglycidyl ether of bisphenol F. The bisphenol in the pre-react adduct functions as a chain extension agent for the linear or cycloaliphatic epoxy. Suitable bisphenols include bisphenol A, tetrabromo bisphenol A (TBBA), Bisphenol Z, and tetramethyl Bisphenol A (TMBP-A).

Suitable elastomers for forming the pre-react adduct include, but are not limited to, liquid elastomers such as amine-terminated butadiene acrylonitrile (ATBN), carboxyl-terminated butadiene acrylonitrile (CTBN), and carboxyl-terminated butadiene (CTB). Also possible are fluorocarbon elastomers, silicone elastomers, styrene-butadiene polymers. In an embodiment, the elastomer used in the pre-react adduct is ATNB, CTBN or CTB.

In one embodiment, the epoxy resin is reacted with the bisphenol chain extension agent and the elastomer polymer in the presence of a catalyst, such as triphenyl phosphine (TPP), at about 300° F. (or 148.9° C.) to chain link the epoxy resins and to form a high viscosity, film-forming, high molecular-weight epoxy resin pre-react adduct. The pre-react adduct is then mixed with the remaining components of the thermoset composition.

Suitable thermoplastic tougheners include polyarylsulfone polymers such as polyether sulfone (PES), polyether ether sulfone (PEES). In some embodiments, the toughening agent is a copolymer of PES and PEES, which is described in U.S. Pat. No. 7,084,213. In some embodiments, the toughener is poly(oxy-1,4-phenylenesulfonyl-1,4-phenylene), which has a $T_g$ of about 200° C. as measured by Differential Scanning calorimetry (DSC).

The toughening agent may be core-shell rubber (CSR) particles having particle size of 300 nm or less. Particle size can be measured by a laser diffraction technique, for example, using a Malvern Mastersizer 2000 instrument. The CSR particles may be any of the core-shell particles where a soft core is surrounded by a hard shell. Preferred CSR particles are those having a polybutadiene rubber core or butadiene-acrylonitrile rubber core and a polyacrylate shell. CSR particles having a hard core surrounded by a soft shell may also be used, however. The CSR particles may be supplied as a 25%-40% in weight percentage of CSR particles dispersed in a liquid epoxy resin. CSR particles having rubber cores and polyacrylate shells are available commercially from Kaneka Tex. Corporation (Houston, Tex.) under the trade names Kane Ace MX. It is preferred, but not required, that the core-shell rubber particles be added to the surfacing film composition as a suspension of particles in a suitable liquid epoxy resin. Kane Ace MX 411 is a suspension of 25% by weight core-shell rubber particles in MY 721 epoxy resin and is a suitable source of core-shell rubber particles. Kane Ace MX 120, MX 125, or MX 156, which contains 25-37% by weight of the same core-shell rubber particles dispersed in DER 331 resin, is also a suitable source of core-shell rubber particles. Other suitable source of core-shell rubber particles, such as MX 257, MX 215, MX217 and MX 451, may also be used. Another commercial source of core-shell rubber particles is Paraloid™ EXL-2691 from Dow Chemical Co. (methacrylate-butadiene-styrene CSR particles with average particle size of about 200 nm).

Ceramic microspheres may be added to the thermoset resin composition to improve the surface smoothness of the final surfacing film. In one embodiment, hollow, ceramic microspheres made of an inert silica-alumina ceramic material are used. The ceramic microspheres may have a crush strength of over 60,000 psi, a dielectric constant of about 3.7-4.6, a softening point in the range of 1000-1100° C. (or 1832-2012° F.), and particle diameters ranging from 0.1 micron to 50 microns, or 1-50 microns. The high softening point of the ceramic microspheres enables them to be nonabsorbent to solvents, non-flammable, and highly resistant to chemicals. Microspheres having diameters ranging from about 0.1 μm to about 20 μm, and preferably from about 1 μm to about 15 μm, have been found to be particularly suitable. An example of commercially available ceramic microspheres which are particularly suitable for use in the present resin film composition are sold by Zeelan Industries, Inc. under the trade name Zeeospheres®, for example, G-200, G210 and W-200. These are hollow, silica-alumina spheres with thick walls, odorless, and light gray in color. In a preferred embodiment, the combination of the multifunctional resins and ceramic microspheres makes up more than 50% by weight, preferably more than 60% by weight, of the resin film composition. In certain embodiments, the amount of ceramic microspheres is at least 20% by weight, preferably at least 25% or at least 30% by weight, based on the total weight of the resin film composition. In some embodiments, the amount of ceramic microspheres may be within the range of 20%-40% by weight, or 25%-35% by weight. In other embodiments, the amount of ceramic microspheres may be within the range of 3%-15% by weight, or 5%-10% by weight.

Suitable curing agents include a variety of latent amine-based curing agents, which are activated at elevated temperatures (e.g. temperature above 150° F. (65° C.)). The term "amine-based" means containing an amine compound or group. Examples of suitable curing agents include dicyandiamide (DICY), 4, 4'-diamino-diphenylsulfone (4,4'DDS), and 3,3'-diaminodiphenylsulfone (3,3'DDS), guanamine, guanidine, aminoguanidine, piperidine, combinations and derivatives thereof. Compounds in the class of imidazoles and amine complexes may also be used. In an embodiment, the curing agent is dicyandiamide. The amine curing agent is present in an amount within the range of about 1% to about 5% by weight based on the total weight of the resin film composition.

A curing accelerator may be used in conjunction with the amine-based curing agent to promote the curing reaction between the epoxy resins and the amine-based curing agent. Suitable curing accelerators may include alkyl and aryl substituted ureas (including aromatic or alicyclic dimethyl urea), and bisureas based on toluenediamine or methylene dianiline. One example of bisurea is 4,4'-methylene bis (phenyl dimethyl urea), commercially available as Omicure U-52 or CA 152 from CVC Chemicals, which is a suitable accelerator for dicyandiamide. Another example is 2,4-toluene bis(dimethyl urea), commercially available as Omicure U-24 or CA 150 from CVC Chemicals. The curing accelerator may be present in an amount within the range of about 0.5% to about 3% by weight based on the total weight of the thermoset composition.

The resin composition may further include conductive materials in particulate form, e.g., in the form of particles or flakes, to increase the electrical conductivity to the surfacing materials. Examples of suitable conductive materials include metals such as silver, gold, nickel, copper, aluminum, bronze, and alloys thereof, in the form of flakes or particles. Carbon-based materials, such as carbon nano-tubes (single-wall nano tubes or multi-wall nano tubes), carbon nano-fibers, and graphene may also be used as conductive additives to impart the electrical conductivity to the resin film. The nano-fibers may have diameters ranging from 70 to 200 nanometers and a length of about 50-200 microns. The nano-tubes may have an outer diameter of about 10 nanometers, length of about 10,000 nanometers, and an aspect ratio (L/D) of about 1000. In addition, conductive additives may also include carbon black particles (such as Printex XE2 from DeGussa). If present, the amount of conductive materials may be in the range of about 3% to about 70% by weight based on the total weight of the resin composition.

Inorganic fillers in particulate form (e.g. powder) may be added to the resin film composition as a rheology modifying component to control the flow of the resinous composition and to prevent agglomeration therein. Suitable inorganic fillers that may be used in the resin film composition include talc, mica, calcium carbonate, alumina, and fumed silica. In one embodiment, hydrophobic fumed silica (e.g. Cab-O-Sil TS-720) is used as the inorganic filler. The amount of inorganic filler may be within the range of 1%-5% by weight based on the total weight of the resin film composition.

The resin composition may further include one or more optional additives such as ultraviolet (UV) stabilizers, pigments and dyes. When such additives are used, their total amount is less than 5% by weight based on the total weight of the resin film composition.

UV stabilizers may be added to the resin composition and include butylated hydroxytoluene (BHT); 2-hydroxy-4-methoxy-benzophenone (e.g. UV-9); 2,4-bis(2,4-dimethylphenyl)-6-(2-hydroxy-4-octyloxyphenyl)-1,3,5-triazine (e.g. CYASORB® UV-1164 light absorber); 3,5-di-tert-butyl-4-hydroxybenzoic acid; n-hexadecyl ester (e.g. CYASORB® UV-2908 light stabilizer); Pentaerythritol Tetrakis (3-(3,5-di-tert-butyl-4-hydroxyphenyl)propionate (e.g. IRGANOX 1010). Liquid hindered-amine light stabilizer from Ciba Specialty Chemicals, such as 2-(2H-benzotriazol-2-yl)-4,6-ditertpentylphenol (e.g. TINUVIN 328), Methyl 1,2,2,6,6-pentamethyl-4-piperidyl sebacate (e.g. TINUVIN 292). Decanedioic acid, bis(2,2,6,6-tetramethyl-1-(octyloxy)-4-piperidinyl ester (e.g. TINUVIN 123), may also be used as suitable UV stabilizers. In addition, nano-sized zinc oxide (n-ZnO), e.g. NanoSunGuard 3015, and NanoBYK 3820; cerium oxide nanoparticles (n-CeO2), e.g. NanoBYK 3810 or 3840; and titanium oxide nanoparticles (n-TiO2) may also be used as UV stabilizers.

Pigments and/or dyes known in the art for adding color to resinous systems may be added to the thermoset resin composition. Examples of pigments and/or dyes include, but are not limited to, red iron oxide, green chromium, carbon black, and titanium oxide. In an embodiment, titanium oxide (white) pigment is added the resin film composition. In another embodiment, carbon black pigment is added.

In one embodiment, the curable resin layers in the multilayer surfacing material are formed from a resin composition containing: an epoxy novolac resin having epoxy functionality of more than one; a tri-functional or tetra-functional epoxy resin; ceramic microspheres; an amine curing agent; and at least one toughening agent selected from a group consisting of: (i) a pre-react adduct formed by the reaction of an epoxy resin, a bisphenol, and an elastomer; (ii) a copolymer of polyether sulfone (PES) and polyetherether sulfone (PEES); (iii) core-shell rubber (CSR) particles; and combinations thereof. In one embodiment, the pre-react adduct is formed by the reaction of diglycidylether of tetrabromo Bisphenol A, bisphenol A, and an elastomer selected from: amine-terminated butadiene acrylonitrile (ATBN); carboxyl-terminated butadiene acrylonitrile (CTBN); and carboxyl-terminated butadiene (CTB). The epoxy resins and the ceramic microspheres make up more than 35% by weight of the total composition, preferably more than 45% by weight.

In another embodiment, the resin composition for one or both of the curable resin layers has the following formulation, in weight percentages based on the total weight of the composition: 20%-25% epoxy phenol novolac resin; 20%-25% tri- or tetra-functional epoxy resin; 10%-15% pre-react adduct, 1%-3% PES-PEES copolymer, 25%-35% ceramic microspheres; 1%-3% fumed silica; 1%-5% amine curing agent; 0.5%-3% curing accelerator; and optionally 0.1-1% color pigment.

The components of the thermoset resin composition may be added to a mixing vessel equipped for mixing, heating, and/or cooling the components. Furthermore, one or more organic solvents may also be added to the mixture, as necessary, to facilitate the mixing of the components. Examples of such solvents may include, but are not limited to, methyl ethyl ketone (MEK), acetone, dimethylacetamide, and N-methylpyrrolidone. A resin film is subsequently formed from the resin composition using conventional film-forming processes.

To facilitate the handling of the resin film, the resin composition may be applied onto a carrier. Non-limiting examples of the carrier may include fibrous sheets made of thermoplastic polymer fibers or carbon fibers, non-woven mats or veils, random mats, knitted and woven fabrics. Examples of non-woven mats include carbon mats, polymer mats, and metal coated veils of carbon, glass, or polymer fibers.

Applications

The surfacing material disclosed herein can be applied onto and co-cured with a fiber-reinforced, resin-impregnated composite substrate at a temperature above 150° F. (65° C.), more particularly, within the range of 200° F. to 365° F. (93° C. to 185° C.) or 250° F. to 350° F. (121° C. to 177° C.).

Composite substrates in this context refer to fiber-reinforced resin composites, including prepregs or prepreg layups (such as those used for making aerospace composite structures). The term "prepreg" as used herein refers to a layer of fibrous material (e.g. unidirectional tows or tape, nonwoven mat, or fabric ply) that has been impregnated with a curable matrix resin. The matrix resin in the composite substrates may be in an uncured or partially cured state. The fiber reinforcement material may be in the form of a woven or nonwoven fabric ply, or unidirectional tape. "Unidirectional tape" refers to a layer of reinforcement fibers, which are aligned in the same direction. The term "prepreg layup" as used herein refers to a plurality of prepreg plies that have been laid up in a stacking arrangement.

Prepregs may be manufactured by infusing or impregnating continuous fibers or woven fabric with a matrix resin system, creating a pliable and tacky sheet of material. This is often referred to as a prepregging process. The precise specification of the fibers, their orientation and the formulation of the resin matrix can be specified to achieve the optimum performance for the intended use of the prepregs. The volume of fibers per square meter can also be specified according to requirements.

The term "impregnate" refers to the introduction of a curable matrix resin to reinforcement fibers so as to partially or fully encapsulate the fibers with the resin. The matrix resin for making prepregs may take the form of resin films or liquids. Moreover, the matrix resin is in a curable/uncured state prior to bonding. Impregnation may be facilitated by the application heat and/or pressure.

The reinforcement fibers may be formed of materials selected from: glass (including Electrical or E-glass), carbon, graphite, aramid, polyamide, high-modulus polyethylene (PE), polyester, poly-p-phenylene-benzoxazole (PBO), boron, quartz, basalt, ceramic, and combinations thereof.

The matrix resin of the composite substrate and prepregs is similar to the thermoset resin composition described above in reference to the curable resin layers of the surfacing material. It contains one or more thermoset resins, e.g., epoxy resins, as the major component, a curing agent, and other additives such as catalysts, co-monomers, rheology control agents, tackifiers, rheology modifiers, inorganic or organic fillers, thermoplastic or elastomeric toughening agents, stabilizers, inhibitors, pigments/dyes, flame retardants, reactive diluents, and other additives well known to those skilled in the art for modifying the properties of the resin matrix before or after curing.

EXAMPLES

Example 1

A woven peel ply fabric with an areal weight of 63 gsm, thickness of 5 mils, 160 warp YPI and 103 fill YPI (52006 from Precision Fabrics Group or PFG) was interposed between two SM 905 surfacing films (100 gsm each) from Cytec Engineered Materials Inc. YPI means yarns per inch. Heat and pressure was applied to the assembled layers to form an integrated surfacing material. The resulting surfacing material was then applied onto a prepreg layup of 1 ply Cycom® 934 prepreg and 6 plies of Cycom® 5276-1 UD prepreg ([0/90/0/90/0/90] layup configuration).

Figure 5:
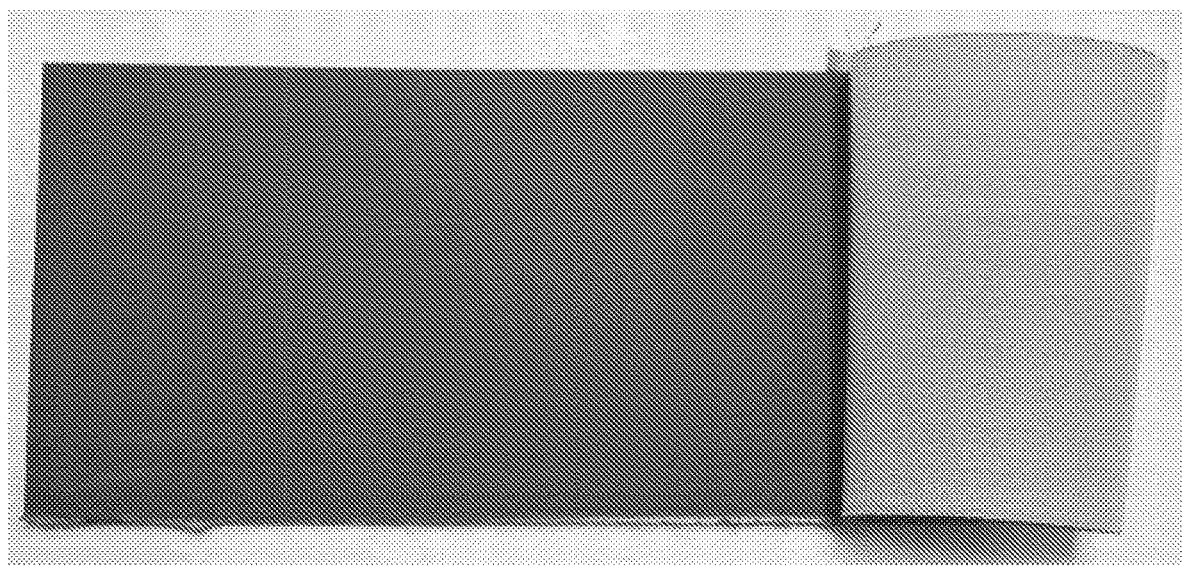
FIG. 5 shows a paint-ready surface of a composite panel after removal of peel ply fabric and protective outer surfacing film according to one example.

The surfacing material and prepreg layup were co-cured in an autoclave at 177° C. for 120 minutes under 40 psi pressure. After curing, a surfaced composite panel was obtained. The exterior peel ply (composed of woven fabric and an outer polymer matrix layer derived from the outer surfacing film) blocked the UV light penetration and protected the underlying surfacing film. When ready for painting, the peel ply was removed to reveal a paint-ready surface (no surface treatment was needed prior to painting). FIG. 5 shows a photographic image of the surfacing film being revealed after peel ply removal.

Example 2

Another surfacing material was prepared as described in Example 1 using the same peel ply fabric (52006) but two SM 910 surfacing films (100 gsm/film) from Cytec Engineered Materials Inc. were used instead of SM 905. Heat and pressure was applied to the assembled layers to form an integrated surfacing material. The resulting surfacing material was applied onto a prepreg layup as described in Example 1 and co-curing was carried out as described in Example 1. When the peel ply fabric was removed together with the outer polymer layer, a smooth paint-ready surface was revealed.

Example 3

Another surfacing material was prepared. The surfacing material was composed of a woven peel ply fabric with an areal weight of 81 gsm, thickness of 5 mils, 120 warp YPI and 59 fill YPI (56111 from Precision Fabrics Group or PFG) interposed between two SM 905 surfacing films (100 gsm each) from Cytec Engineered Materials Inc. Heat and pressure was applied to the assembled layers to form an integrated surfacing material. The resulting surfacing material was applied onto a prepreg layup as described in Example 1 and co-curing was carried out as described in Example 1. When the peel ply fabric was removed together with the outer polymer layer, a smooth paint-ready surface was revealed.

Example 4

A surfacing material was prepared as described in Example 3 using the same peel ply fabric (56111) except that SM 910 surfacing films were used. The surfacing material was applied onto a prepreg layup and co-curing was carried out as described in Example 1. When the peel ply fabric was removed together with the outer polymer layer, a smooth paint-ready surface was revealed.

Example 5

A conductive surfacing material was prepared using the same peel ply fabric (52006) and SM 905 surfacing films as described in Example 1 and adding a copper screen (175 gsm). The peel ply fabric was interposed between the two surfacing films and the copper screen was laminated to one of the surfacing films. The surfacing material was applied onto a prepreg layup as described in Example 1, whereby the copper screen is in contact with the prepreg layup. Co-curing was carried out as described in Example 1. When the peel ply fabric was removed together with the outer polymer layer, a smooth paint-ready surface was revealed.

Example 6

Example 5 was repeated except that SM 910 surfacing films were used for the surfacing material instead of SM 905 surfacing films.

Table 1 summarizes the configurations of the surfacing materials disclosed in Examples 1-6.

TABLE 1

| Example No. | Description of Surfaced Composite Panel | Surfacing Film 1 | Woven Peel Ply Fabric | Surfacing Film 2 | Conductive Layer |
|---|---|---|---|---|---|
| 1 | Surfacing Film 1/peel ply fabric/Surfacing Film 2/Prepregs | SM 905 | 52006 from PFG | SM 905 | — |
| 2 | Surfacing Film 1/peel ply fabric/Surfacing Film 2/Prepregs | SM 910 | 52006 from PFG | SM 910 | — |
| 3 | Surfacing Film 1/peel ply fabric/Surfacing Film 2/Prepregs | SM 905 | 56111 from PFG | SM 905 | — |
| 4 | Surfacing Film 1/peel ply fabric/Surfacing Film 2/Prepregs | SM 910 | 56111 from PFG | SM 910 | — |
| 5 | Surfacing Film 1/peel ply fabric/Surfacing Film 2/Cu screen/Prepregs | SM 905 | 52006 from PFG | SM 905 | Copper screen (175 gsm) |
| 6 | Surfacing Film 1/peel ply fabric/Surfacing Film 2/Cu screen/Prepregs | SM 910 | 52006 from PFG | SM 910 | Copper screen (175 gsm) |

UV Exposure Test

The cured surfacing materials disclosed in Examples 1-6 (prior to peel ply removal) were subjected to a QUV test to determine UV stability.

UV stability was measured by exposing the cured composite panel with the surfacing film thereon to UV radiation in a QUV test chamber (UVA lamp at 340 nm, intensity of 1.35 W/m$^2$, test temperature=65° C.). After QUV exposures at various intervals, the total Color Change (delta E* or ΔE* value) of the surfacing film underneath the peel ply fabric was measured by using X-Rite SP62 spectrophotometer. The smaller ΔE* value means less color change, and better UV stability. The UV stability test results are summarized in Table 2.

TABLE 2

Total Color Change (ΔE*) after UV exposure

| Example No. | Description of Surfaced Composite Panel | QUV exposure 48 hrs | QUV exposure 96 hrs | QUV exposure 168 hrs |
|---|---|---|---|---|
| 1 | SM 905/52006 fabric/SM 905/Prepregs | 0.15 | 0.18 | 0.33 |
| 2 | SM 910/52006 fabric/SM 910/Prepregs | 0.12 | 0.23 | 0.32 |
| 3 | SM 905/56111 fabric/SM 905/Prepregs | 0.20 | 0.27 | 0.35 |
| 4 | SM 910/56111 fabric/SM 910/Prepregs | 0.16 | 0.21 | 0.26 |
| 5 | SM 905/52006 fabric/SM 905/Copper screen/Prepregs | 0.16 | 0.25 | 0.35 |
| 6 | SM 910/52006 fabric/SM 910/Copper screen/Prepregs | 0.15 | 0.21 | 0.33 |

As shown in Table 2, composite panels surfaced with UV protective surfacing film have shown excellent UV stability (minimal or non-noticeable color change observed) over the extended high intensity UV exposures. As such, the exterior peel ply consisting of combined peel ply fabric and outer cured surfacing film provided effective UV protection to the underlying surfacing film.

Paint Adhesion Test

After UV exposure test, the outer peel ply layer on each cured composite panel was removed and the underlying surface was painted using an epoxy paint primer followed by a polyurethane based top-coat without any intervening surface treatment. Subsequently, dry paint adhesion test was conducted in accordance with ASTM D3359. ASTM D3359 refers to a Standard Test Method for assessing the surface adhesion of coating films to substrates by applying and removing pressure-sensitive tape over cuts made in the film (cross-hatch scribe tape test). The paint adhesion test was carried out using 45° cross-hatch scribe (class 5) test and the results are summarized in Table 3.

TABLE 3

Paint Adhesion Test Results (per ASTM D3359)

| Example No. | Description of Surfaced Composite Panel | QUV exposure 48 hrs | QUV exposure 96 hrs | QUV exposure 168 hrs |
|---|---|---|---|---|
| 1 | SM 905/52006 fabric/SM 905/Prepregs | 10 | 10 | 10 |
| 2 | SM 910/52006 fabric/SM 910/Prepregs | 10 | 10 | 10 |
| 3 | SM 905/56111 fabric/SM 905/Prepregs | 10 | 10 | 10 |
| 4 | SM 910/56111 fabric/SM 910/Prepregs | 10 | 10 | 10 |
| 5 | SM 905/52006 fabric/SM 905/Cu screen/Prepregs | 10 | 10 | 10 |
| 6 | SM 910/52006 fabric/SM 910/Cu screen/Prepregs | 10 | 10 | 10 |

As shown in Table 3, without surface treatment, composite panels surfaced with UV protective surfacing film showed excellent paint adhesion (ranking 10 of 10) with 100% paint adhesion retention.

Terminology

In the present disclosure, the modifier "approximately" and "about" used in connection with a quantity is inclusive of the stated value and has the meaning dictated by the context, (e.g., includes the degree of error associated with measurement of the particular quantity). For example, a number following "about" can mean the recited number plus or minus 0.1% to 1% of that recited number. The suffix "(s)" as used herein is intended to include both the singular and the plural of the term that it modifies, thereby including one or more of that term (e.g., the metal(s) includes one or more metals). Ranges disclosed herein are inclusive of the endpoints and all intermediate values of the ranges, for example, "1% to 10%" includes 1%, 1.5%, 2%, 2.5%, 3%, 3.5%, etc.

The invention claimed is:

1. A surfacing material that is capable of ultraviolet (UV) protection, comprising:
   a woven peel ply fabric interposed between a first curable resin layer and a second curable resin layer,
   wherein
   the woven peel ply fabric comprises polymeric fibers, has a thickness in the range of 76 μm to 127 μm, a warp yarn count of greater than 70 yarns per square inch, and a weft yarn count of at least 50 yarns per square inch, and
   each curable resin layer is formed from a resin composition comprising:
   an epoxy novolac resin having epoxy functionality of more than one;
   a tri-functional or tetra-functional epoxy resin;
   ceramic microspheres;
   an amine-based curing agent;
   at least one toughening agent selected from a group consisting of: (i) a pre-react adduct formed by the reaction of an epoxy resin, a bisphenol, and an elastomer; (ii) a copolymer of polyether sulfone (PES) and polyetherether sulfone (PEES); and (iii) core-shell rubber (CSR) particles.

2. The surfacing material of claim 1, wherein the warp yarn count is 120-200 yarns per square inch and the weft yarn count is 50-140 yarns per square inch.

3. The surfacing material of claim 1, wherein the woven peel ply fabric is comprised of woven polyester fibers or polyamide fibers.

4. The surfacing material according to claim 1, wherein the first and second curable resin layers do not comprise any reinforcement fiber.

5. The surfacing material according to claim 1, further comprising an electrically conductive layer laminated to one side of the first curable resin layer such that the first curable resin layer is between the woven peel ply fabric and the conductive layer.

6. The surfacing material according to claim 5, wherein the electrically conductive layer is selective from: a porous metal screen, a solid metal foil, and a sheet of carbon.

7. The surfacing material according to claim 1, wherein the resin composition further comprises fumed silica.

8. The surfacing material according to claim 1, wherein the first curable resin layer and the second curable resin layer have the same resin composition.

9. The surfacing material according to claim 1, wherein the first curable resin layer and the second curable resin layer have different resin compositions.

10. A method for forming a composite structure with an outer surface that is ready for painting, the method comprising:
    placing the surfacing material according to claim 1 onto a prepreg layup of multiple prepreg plies such that the second curable resin layer is the outer layer relative to first curable resin layer, each prepreg ply comprising reinforcement fibers impregnated with or embedded in a curable matrix resin;
    co-curing the surfacing material and the prepreg layup so as to form a cured composite structure in which the second resin layer becomes a removable outer thermoset layer; and
    removing the woven peel ply fabric together with the outer thermoset layer to reveal a hardened or cured surface that is ready for painting.

11. The method of claim 10, wherein co-curing is carried out in the temperature range of 250° F. to 350° F.

12. A composite laminate comprising a prepreg layup having the surfacing material according to claim 1 on its surface,
    wherein the prepreg layup is comprised of multiple prepreg plies, each prepreg ply comprising reinforcement fibers impregnated with or embedded in a curable matrix resin.

* * * * *